(12) United States Patent
Sander et al.

(10) Patent No.: US 10,701,044 B2
(45) Date of Patent: Jun. 30, 2020

(54) SHARING OF COMMUNITY-BASED SECURITY INFORMATION

(71) Applicant: HEWLETT PACKARD ENTERPRISE DEVELOPMENT LP, Houston, TX (US)

(72) Inventors: Tomas Sander, Princeton, NJ (US); Nadav Cohen, Sunnyvale, CA (US); Brian Frederik Hosea Che Hein, Aliso Viejo, CA (US); Amir Kibbar, Sunnyvale, CA (US); Ted Ross, Austin, TX (US)

(73) Assignee: MICRO FOCUS LLC, Santa Clara, CA (US)

( * ) Notice: Subject to any disclaimer, the term of this patent is extended or adjusted under 35 U.S.C. 154(b) by 190 days.

(21) Appl. No.: 15/737,864

(22) PCT Filed: Jun. 26, 2015

(86) PCT No.: PCT/US2015/038129
§ 371 (c)(1),
(2) Date: Dec. 19, 2017

(87) PCT Pub. No.: WO2016/209288
PCT Pub. Date: Dec. 29, 2016

(65) Prior Publication Data
US 2018/0359232 A1    Dec. 13, 2018

(51) Int. Cl.
*H04L 29/06*    (2006.01)
*G06F 21/62*    (2013.01)

(52) U.S. Cl.
CPC ........ *H04L 63/061* (2013.01); *G06F 21/6218* (2013.01); *H04L 63/0428* (2013.01); *G06F 2221/2115* (2013.01)

(58) Field of Classification Search
CPC ......... H04L 63/20; H04L 41/06; H04L 43/06; H04L 63/1408; H04L 41/00; H04L 29/06
See application file for complete search history.

(56) References Cited

U.S. PATENT DOCUMENTS 6,807,569 B1    10/2004    Bhimani et al.
7,861,299 B1    12/2010    Tidwell et al.
(Continued)

OTHER PUBLICATIONS

Berkeley, A.R., et al., Intelligence Information Sharing, Jan. 10, 2012, National Infrastructure Advisory Council, 228 pages.
(Continued)

*Primary Examiner* — Christopher A Revak

(57) ABSTRACT

Examples disclosed herein relate to sharing of community-based security information. Some examples may enable generating a first community on a security information sharing platform that enables sharing of security information among a plurality of communities; obtaining a first security indicator from a first user of the first community; providing the first security indicator to the first community; obtaining contextual information related to the first security indicator from a second user of the first community; including the first security indicator and the contextual information related to the first security indicator in the security information of the first community; and encrypting a portion of the security information of the first community with an encryption key, wherein the encryption key is unavailable to users outside of the first community.

20 Claims, 5 Drawing Sheets

(56) References Cited

U.S. PATENT DOCUMENTS

| | | | |
|---|---|---|---|
| 8,220,056 | B2 | 7/2012 | Owens |
| 8,239,668 | B1 | 8/2012 | Chen et al. |
| 8,281,370 | B2 | 10/2012 | Robbins et al. |
| 8,464,335 | B1 | 6/2013 | Sinha et al. |
| 8,607,353 | B2 | 12/2013 | Rippert et al. |
| 8,649,515 | B1 | 2/2014 | Zhao et al. |
| 8,887,248 | B2* | 11/2014 | Ganesan ............... H04L 63/104 726/4 |
| 9,143,892 | B2* | 9/2015 | Kuehnel ............... H04W 4/023 |
| 9,313,177 | B2* | 4/2016 | Blumenfeld ........ G06F 21/6254 |
| 9,342,796 | B1* | 5/2016 | McClintock ........... G06N 20/00 |
| 9,537,889 | B2* | 1/2017 | Kuehnel ................ H04L 47/34 |
| 10,389,719 | B2* | 8/2019 | Spies ................... H04L 63/065 |
| 2005/0018618 | A1 | 1/2005 | Mualem et al. |
| 2005/0251675 | A1 | 11/2005 | Marchan et al. |
| 2007/0106551 | A1 | 5/2007 | McGucken |
| 2008/0256359 | A1 | 10/2008 | Kahn et al. |
| 2010/0057850 | A1* | 3/2010 | Kim .................... H04L 12/1822 709/204 |
| 2012/0011077 | A1 | 1/2012 | Bhagat |
| 2012/0110633 | A1 | 5/2012 | An et al. |
| 2012/0246730 | A1 | 9/2012 | Raad |
| 2012/0278101 | A1 | 11/2012 | Homchowdhury et al. |
| 2013/0144879 | A1 | 6/2013 | Kuehnel |
| 2013/0179948 | A1 | 7/2013 | Ho et al. |
| 2013/0254880 | A1* | 9/2013 | Alperovitch ............ G06F 21/51 726/22 |
| 2014/0281486 | A1* | 9/2014 | Nayshtut ............. G06F 21/6227 713/153 |
| 2015/0381637 | A1* | 12/2015 | Raff .................... H04L 63/0218 726/23 |
| 2016/0277374 | A1* | 9/2016 | Reid ..................... H04L 63/061 |
| 2016/0308890 | A1* | 10/2016 | Weilbacher ......... H04L 63/1408 |
| 2016/0337484 | A1* | 11/2016 | Tola .................... H04L 12/6418 |
| 2017/0102933 | A1* | 4/2017 | Vora .......................... G06F 8/65 |
| 2017/0187742 | A1* | 6/2017 | Rogers ............... H04L 63/1433 |
| 2017/0264619 | A1* | 9/2017 | Narayanaswamy .. H04L 63/104 |
| 2018/0103054 | A1* | 4/2018 | Cran ................... H04L 63/1433 |
| 2018/0137275 | A1* | 5/2018 | Ekambaram .......... G06F 21/556 |
| 2018/0198813 | A1* | 7/2018 | Grubb ................. H04L 63/1433 |
| 2018/0232526 | A1* | 8/2018 | Reid ..................... H04L 9/3239 |
| 2018/0234458 | A1* | 8/2018 | Sander ..................... H04L 29/06 |
| 2019/0036686 | A1* | 1/2019 | Spies .................... H04L 9/0847 |
| 2019/0036938 | A1* | 1/2019 | Sander ................ G06F 21/6218 |

OTHER PUBLICATIONS

Enisa, Detect, Share, Protect Solutions for Improving Threat Data Exchange Among Certs, Oct. 2013, European Union Agency for Network and Information Security, 51 pgs.

International Search Report & Written Opinion, PCT Patent Application No. PCT/US2015/038129, Mar. 25, 2016, 10 pages.

International Search Report & Written Opinion, PCT Patent Application No. PCT/US2015/038139, Apr. 25, 2016, 13 pages.

Internet Identity, IID Launches Activetrust Cyber Threat Sharing and Collaboration Network, Feb. 11, 2014, Retrieved from the Internet:<http://internetidentity.com/press-r.

Kesan, J.P., et al., Creating a 'Circle of Trust' to Further Digital Privacy and Cybersecurity Goals, Aug. 18, 2014, Michigan State Law Review, 86 pages.

Threatconnect, Community Collaboration Enables Threat Detection, Jan. 9, 2014, Retrieved from the Internet:<http://www.threatconnect.com/resources/case_studies/private_comm.

Barnum, S., Cyber Observables and Integration with EMAP, EMAP 2011 Developers Days, U.S. Homeland Security, Aug. 2011, 31 pages.

Barnum, S., STIX—Structured Threat Information Expression, MITRE, Feb. 2014, 28 pages.

Internet Identity, IID Launches Activetrust Cyber Threat Sharing and Collaboration Network, Feb. 11, 2014, Retrieved from the Internet: <http://internetidentity.com/press-release/iid-launches-activetrust-cyber-threat-sharing-and-collaboration-network/> [retrieved on May 28, 2015], 3 pages.

Sandhu et al., RT-Based Administrative Models for Community Cyber Security Information Sharing, 2011 (6 pages).

The MITRE Corporation, TAXII—An Overview, Jul. 2013, 32 pages.

U.S. Appl. No. 15/737,878, Non-Final Office Action dated Sep. 3, 2019, pp. 1-7 and attachments.

* cited by examiner

SHARING OF COMMUNITY-BASED SECURITY INFORMATION

BACKGROUND

Users of a security information sharing platform share security indicators, security alerts, and/or other security-related information (e.g., mitigations strategies, attackers, attack campaigns and trends, threat intelligence information, etc.) with other users in an effort to advise the other users of any security threats, or to gain information related to security threats from other users.

BRIEF DESCRIPTION OF THE DRAWINGS

The following detailed description references the drawings, wherein.

DETAILED DESCRIPTION

Figure 1:
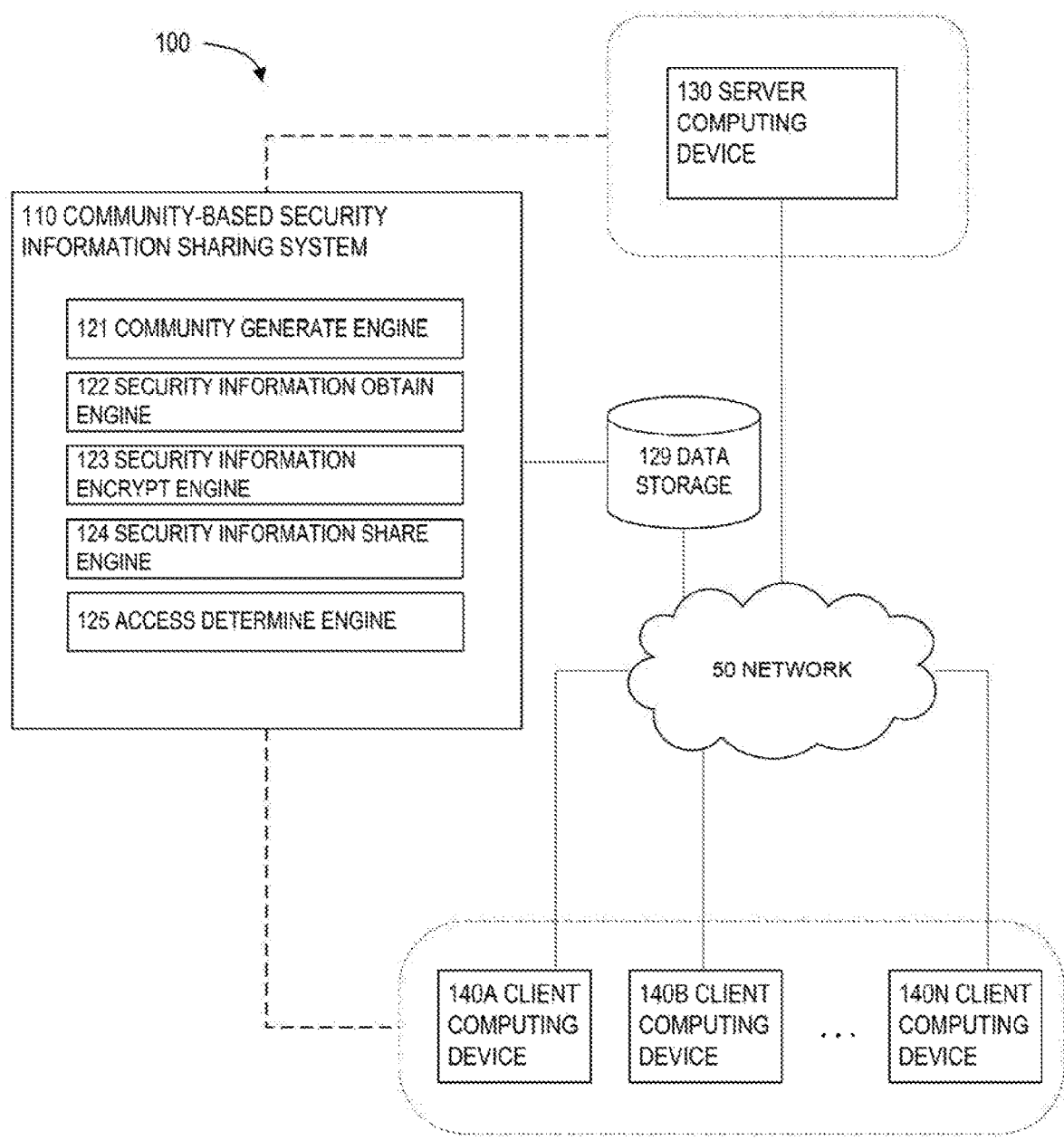
FIG. 1 is a block diagram depicting an example environment in which various examples may be implemented as a community-based security information sharing system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus.

Users of a security information sharing platform share security indicators, security alerts, and/or other information (e.g., mitigations strategies, attackers, attack campaigns and trends, threat intelligence information, etc.) with other users in an effort to advise the other users of any security threats, or to gain information related to security threats from other users. The other users with whom the security information is shared typically belong to a community that is selected by the user for sharing, or to the same community as the user. The other users of such communities may further share the security information with further users and/or communities. A "user," as used herein, may include an individual, organization, or any entity that may send, receive, and/or share the security information. A community may include a plurality of users. For example, a community may include a plurality of individuals in a particular area of interest. A community may include a global community where any user may join, for example, via subscription. A community may also be a vertical-based community. For example, a vertical-based community may be a healthcare or a financial community. A community may also be a private community with a limited number of selected users.

In some instances, a community (and/or users thereof) may want to control access to community-based security information. The "community-based security information," as used herein, may refer to any security indicators, contextual information (related to those security indicators, the community, etc.), or any other information originated from (and/or submitted to the community) by a user of that community. "Access," as used herein, may refer to an ability to view/read, modify, delete, or a combination thereof. For example, a community for a particular financial institution may want to share a security indicator with the security information sharing platform (e.g., the security indicator may be visible to a system administrator of the platform) but not with the users of other communities because the particular financial institution may not want to disclose to the other financial institutions and the finance industry that it is under threat of security attacks.

Examples disclosed herein provide technical solutions to these technical challenges by selectively sharing and/or encrypting the community-based security information. Some examples may enable generating a first community on a security information sharing platform that enables sharing of security information among a plurality of communities; obtaining a first security indicator from a first user of the first community; providing the first security indicator to the first community; obtaining contextual information related to the first security indicator from a second user of the first community; including the first security indicator and the contextual information related to the first security indicator in the security information of the first community; and encrypting a portion of the security information of the first community with an encryption key, wherein the encryption key is unavailable to users outside of the first community.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is an example environment 100 in which various examples may be implemented as a community-based security information sharing system 110. Environment 100 may include various components including server computing device 130 and client computing devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, community-based security information sharing system 110 and the various components described herein may be implemented in hardware and/or a combination of hardware and programming that configures hardware. Furthermore, in FIG. 1 and other Figures described herein, different numbers of components or entities than depicted may be used.

Community-based security information sharing system 110 may comprise a community generate engine 121, a security information obtain engine 122, a security information encrypt engine 123, a security information share engine 124, an access determine engine 125, and/or other engines. The term "engine", as used herein, refers to a combination of hardware and programming that performs, a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Community generate engine 121 may generate a community on a security information sharing platform. The security information sharing platform, as discussed above, may enable sharing of security information among a plurality of communities. The community may comprise a plurality of users. The generation of the community may be user-initiated or system-initiated. For example, a user may create the community by providing a list of users to be included, in the community. In another example, the security information sharing platform may automatically identify an for invite users who might be interested in joining the community based on information that have been collected about users of the platform (e.g., the platform may automatically identify and/or invite users who have been under similar security threats in the past).

Security information obtain engine 122 may obtain a security indicator for the community (e.g., generated by community generate engine 121 as discussed herein). The security indicator may comprise at least one observable. A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus. An "observable," as used herein, may refer to an event pertinent to the operation of computers and networks (e.g., an event occurring in network, servers, applications, databases, and/or various components of any computer system). Examples of an observable may include but not be limited to: an IP address, a domain name, an e-mail address, Uniform Resource Locator (URL), and a software file hash. A security indicator may comprise a single observable (e.g., "a new file, is created by an executable") or a plurality of observables (e.g., "a new file is created by an executable and "the executable connects to domain X").

A security indicator may be created by and/or originated from at least one of a plurality of source entities. For example, the plurality of source entities may include a user. A security indicator may be manually created and/or added to the security information sharing platform by the user. In another example, the plurality of source entities may include a threat intelligence provider that provides threat intelligence feeds. A security indicator that is found in the intelligence feeds, for example, may be created and/or added to the security information sharing platform. There exist a number of providers of threat intelligence feeds. The threat intelligence feeds may be provided by independent third parties such as security service providers. These providers and/or sources may supply the threat intelligence feeds that provide information about threats the providers have identified. Most threat intelligence feeds, for example, include lists of domain names, IP addresses, and URLs that various providers have classified as malicious or at least suspicious according to different methods, and criteria.

"Contextual information" related to a security indicator, as used herein, may comprise information about: an investigation result that is provided by a user of the community, an indicator score for the security indicator, a source entity for the security indicator, a threat actor (e.g., attacker) for the security indicator, a level of confidence (e.g., the level of confidence that the indicator is actually malicious), the level of severity (e.g., the level of severity or likely impact that the indicator may pose), a sighting of an observable of the security indicator, and/or other information related to the security indicator. In some implementations, the contextual information may include information specific to the community itself such as an industry sector (e.g., the industry sector that the community is in), a geography (e.g., a geographical region where the community is located in), a common interest, area, and/or other information related to the community.

In some implementations, security information obtain engine 122 may obtain a security indicator for the community and/or include the security indicator (and/or contextual information related to the security indicator) in the community based security information of that community. For example, a user of the community may create and/or submit the security indicator to the community using the security information sharing platform. The user when creating the security indicator may specify some contextual information related to the security indicator such as a level of confidence associated with the security indicator (e.g., the level of confidence that the indicator is actually malicious) and/or a level of severity (e.g., likely impact) associated with the security indicator (e.g., the level of severity or likely impact that the indicator may, pose), and/or other information the user is aware of about the security indicator.

In some implementations, security information obtain engine 122 may provide the security indicator to the community to obtain additional contextual information about the security indicator from the users of the community. For example, a user of the community may create a new security indicator using the security information sharing platform and/or submit it to the community so that other users of the community may collaboratively investigate the security indicator and provide their input. In doing so security information obtain engine 122 may present, via a user interface (e.g., of the security information sharing platform), the security indicator to the users of the community. A user of the community may investigate the security indicator being presented, assess the reliability of the source entity of the indicator, the level of confidence, and/or the level of severity, report a sighting of an observable (e.g., a sighting indicating that the user observed the observable), provide information about a potential threat actor (e.g., attacker) behind the security indicator, etc. The security indicator along with any associated contextual information may be included and/or stored as part of the community-based security information of that community.

Security information encrypt engine 123 may encrypt a portion of the community-based security information with an encryption key. The encryption key is unavailable to users outside of the community. In other words, the encryption key may be uniquely known to the community. In some Implementations, the encryption key may be known to a particular user or a particular set of users of that community. Any encryption techniques known in the art may be used to encrypt the community-based security information (or any portion thereof). Security information encrypt engine 123 may encrypt a portion of the community-based security information while leaving the rest of the community-based security information to remain unencrypted. For example, the security indicators may be left unencrypted while contextual information about whether the attack or threat identified in the indicator was indeed successful can be encrypted.

In some implementations, the encryption key may be provided to a particular user or a set of users outside of the community, all users of another community, a set of communities, etc. The holder of the encryption key may use the encryption key to decrypt the encrypted portion to gain access to that portion of the community-based security information.

Security information share engine 124 may share the community-based security information of the community with users outside of the community. The community may choose to keep the security indicator (and/or associated contextual information) private within the community or selectively share the security indicator (and/or associated contextual information) with the security sharing platform, another community, and/or another user. The community-based security information that is kept private within the community may be accessed by the users who belong to that community but may not be accessible by or visible to the security information sharing platform, another community, and/or another user.

In one example, the community may selectively share at least a portion of the community-based security information with the security information sharing platform where the security information sharing platform (e.g., a system administrator of the platform) may have access to the shared portion but no other communities have access to the shared portion. This may be useful, for example, when a particular financial institution wants to obtain information regarding its security indicator (e.g., the information shared by other communities regarding that security indicator) from the security information sharing platform but does not want to disclose that the particular financial institution might be under threat of such security indicator to other communities.

In another example, the community may selectively share at least a portion of the community-based security information with a user of another community. In doing so, the community may specify an identification of users and/or communities with whom the security information is being shared and/or a characteristic of users and/or communities (e.g., industry, geography, interest area, etc.) with whom the security information should be shared.

In some implementations, some of the shared portion may have been encrypted by security information encrypt engine 123. In this case, the user with whom the portion is being shared may have access to the shared portion other than the encrypted portion.

Note that a particular user of the community may have access to: the community-based security information of the community and the community-based security information of other communities being shared with the community (or with the particular user). In addition, there may be security information stored on the security information sharing, platform that do not belong to any communities. That information may be public and therefore accessible by all of the users of the platform regardless of which community individual users belong to.

Access determine engine 125 may receive, from a first user who does not belong to the community, a request to access the community-based security information of the community. Upon receiving the request, access determine engine 125 may determine whether the community-based security information of the community is shared with the first user. In some implementations, the community-based security information may include a portion encrypted with an encryption key that is uniquely known to the community (e.g., as discussed herein with respect to security information encrypt engine 123). Even if the community-based security information is being shared with the first user, the first user may not have access to the encrypted portion without obtaining this encryption key. Thus, access determine engine 125 may, in response to determining that the community-based security information of the community is shared with the first user, authorize the first user to access the shared security information other than the encrypted portion.

In some implementations, access determine engine 125 may receive, from a second user who belongs to the community, the request to access the community-based security information of the community. Since the second user is within the community, the second user may have access to the community-based security information of the community and/or any encrypted portions therein given that the encryption key is known to the second user. Note that the second user may have access to: the community-based security information of the community and the community-based security information of other communities being shared with the community (or with the second user). In addition, there may be security information stored on the security information sharing platform that do not belong to any communities. That information may be public and therefore accessible by all of the users of the platform regardless of which community individual users belong to.

In performing their respective functions, engines 121-125 may access data storage 129 and/or other suitable database(s). Data storage 129 may represent any memory accessible to community-based security information sharing system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Community-based security information sharing system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
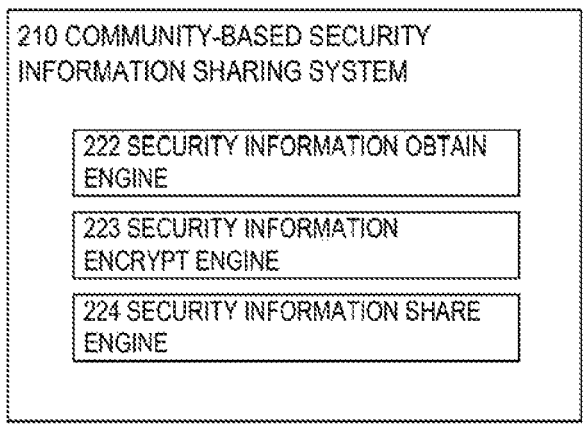
FIG. 2 is a block diagram depicting an example community-based security information sharing system.

FIG. 2 is a block diagram depicting an example community-based security information sharing system 210. Community-based security information sharing system 210 may comprise a security information obtain engine 222, a security information encrypt engine 223, a security information share engine 224, and/or other engines. Engines 222-224 represent engines 122-124, respectively.

Figure 3:
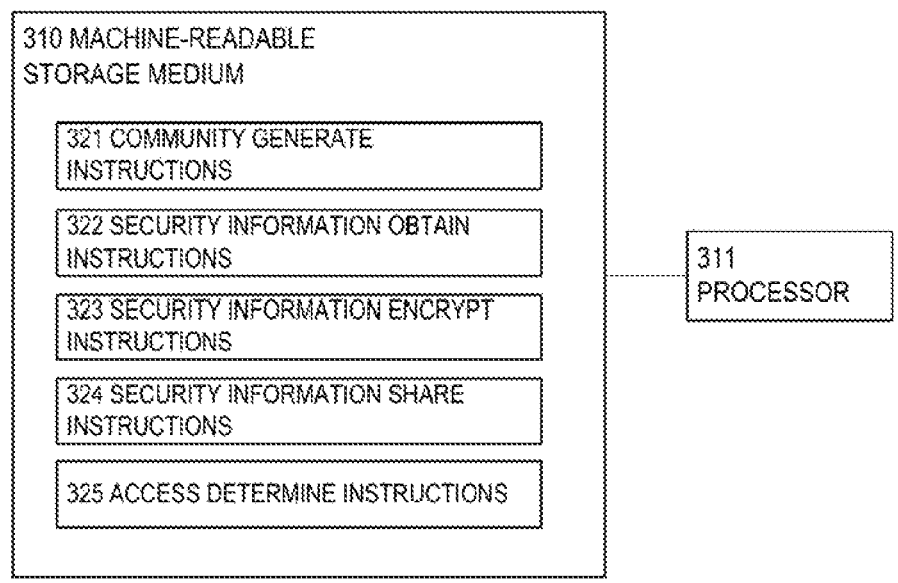
FIG. 3 is a block diagram depicting an example machine-readable storage medium comprising instructions executable by a processor for sharing community-based security information.

FIG. 3 is a block diagram depicting an example machine-readable storage medium 310 comprising instructions executable by a processor for sharing community-based security information.

In the foregoing discussion, engines 121-125 were described as combinations of hardware and programming. Engines 121-125 may be implemented in a number of fashions. Referring to FIG. 3, the programming may be processor executable instructions 321-325 stored on a machine-readable storage medium 310 and the hardware may include a processor 311 for executing those instructions. Thus, machine-readable storage medium 310 can be said to store program instructions or code that when executed by processor 311 implements community-based security information sharing system 110 of FIG. 1.

In FIG. 3, the executable program instructions in machine-readable storage, medium 310 are depicted as community generate instructions 321, security information obtain instructions 322, security information encrypt instructions 323, security information share instructions 324, and access determine instructions 325. Instructions 321-325 represent program instructions that, when executed, cause processor 311 to implement engines 121-125, respectively.

Figure 4:
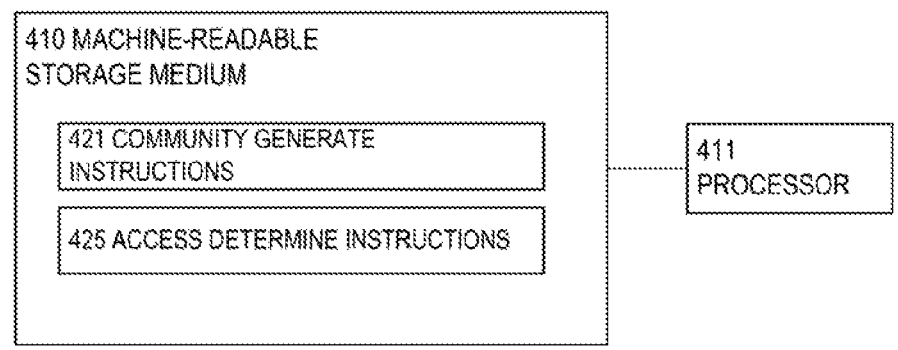
FIG. 4 is a block diagram depicting an example machine-readable storage medium comprising instructions executable by a processor for sharing community-based security information.

FIG. 4 is a block diagram depicting an example machine-readable storage medium 410 comprising instructions executable by a processor for sharing community-based security information.

Referring to FIG. 4, the programming may be processor executable instructions 421 and 425 stored on a machine-readable storage medium 410 and the hardware may include a processor 411 for executing those instructions. Thus, machine-readable storage medium 410 can be said to store program instructions or code that when executed by processor 411 implements community-based security information sharing system 110 of FIG. 1.

In FIG. 4, the executable program instructions in machine-readable storage medium 410 are depicted as community generate instructions 421 and access determine instructions 425. Instructions 421 and 425 represent program instructions that, when executed, cause processor 411 to implement engines 121 and 125, respectively.

Machine-readable storage medium 310 (or machine-readable storage medium 410) may be any electronic, magnetic, optical, or other physical storage device that contains or stores executable instructions. In some implementations, machine-readable storage, medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program Instructions may be part of an installation package that when installed can be executed by processor 311 (or processor 411) to implement community-based security information sharing system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-325, and/or other instructions. As an alternative or in addition to retrieving and executing instructions, processor 311 may include at least one electronic circuit comprising a number of electronic components for performing the functionality of at least one of instructions 321-325, and/or other instructions.

Processor 411 may be at least one central processing unit (CPU), microprocessor, and/or other hardware, device suitable for retrieval and execution of instructions stored in machine-readable storage medium 410. Processor 411 may fetch, decode, and execute program instructions 421 and 425, and/or other instructions. As an alternative or in addition to retrieving and executing instructions, processor 411 may include at least one electronic circuit comprising a number of electronic components for performing the functionality of at least one of instructions 421 and 425, and/or other instructions.

Figure 5:
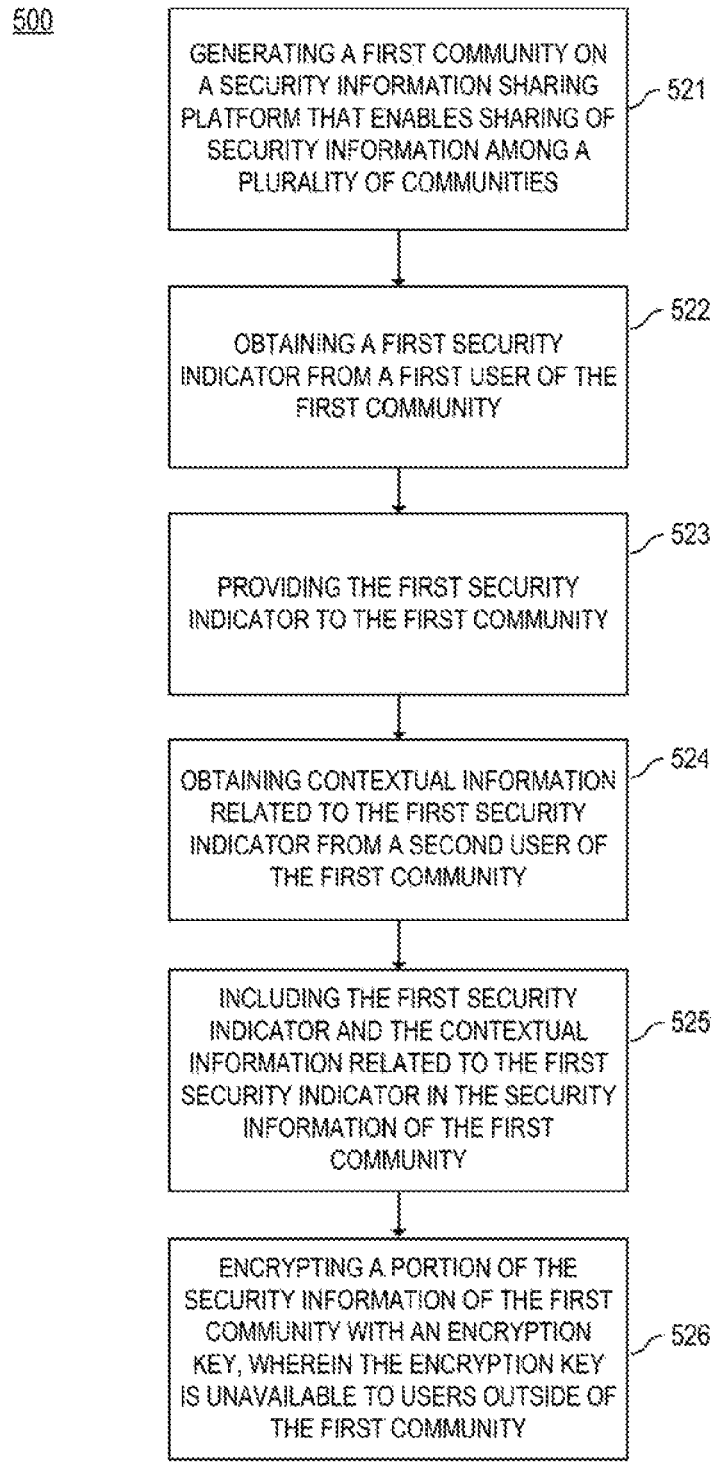
FIG. 5 is a flow diagram depicting an example method for sharing community-based security information.

FIG. 5 is a flow diagram depicting an example method 500 for sharing community-based security information. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant be an example and, as such, should not be viewed as limiting. Method 500 may be implemented in the form of executable instructions stored on a machine-readable storage medium, such as storage medium 310, and/or in the form of electronic circuitry.

In block 521, method 500 may include generating a first community on a security information sharing platform that enables sharing of security information among a plurality of communities. Referring back to FIG. 1, community generate engine 121 may be responsible for implementing block 521.

In block 522, method 500 may include obtaining a first security indicator from a first user of the first community. Referring back to FIG. 1, security information obtain engine 122 may be responsible for implementing block 522.

In block 523, method 500 may include providing the first security indicator to the first community. Referring back to FIG. 1, security information obtain engine 122 may be responsible for implementing block 523.

In block 524, method 500 may include obtaining contextual information related to the first security indicator from a second user of the first community. Referring back to FIG. 1, security information obtain engine 122 may be responsible for implementing block 524.

In block 525, method 500 may include including the first security indicator and the contextual information related to the first security indicator in the security information of the first community. Referring back to FIG. 1, security information obtain engine 122 may be responsible for implementing block 525.

In block 526, method 500 may include encrypting a portion of the security information of the first community with an encryption key, wherein the encryption key is unavailable to users outside of the first community. Referring back to FIG. 1, security information encrypt engine 123 may be responsible for implementing block 526.

Figure 6:
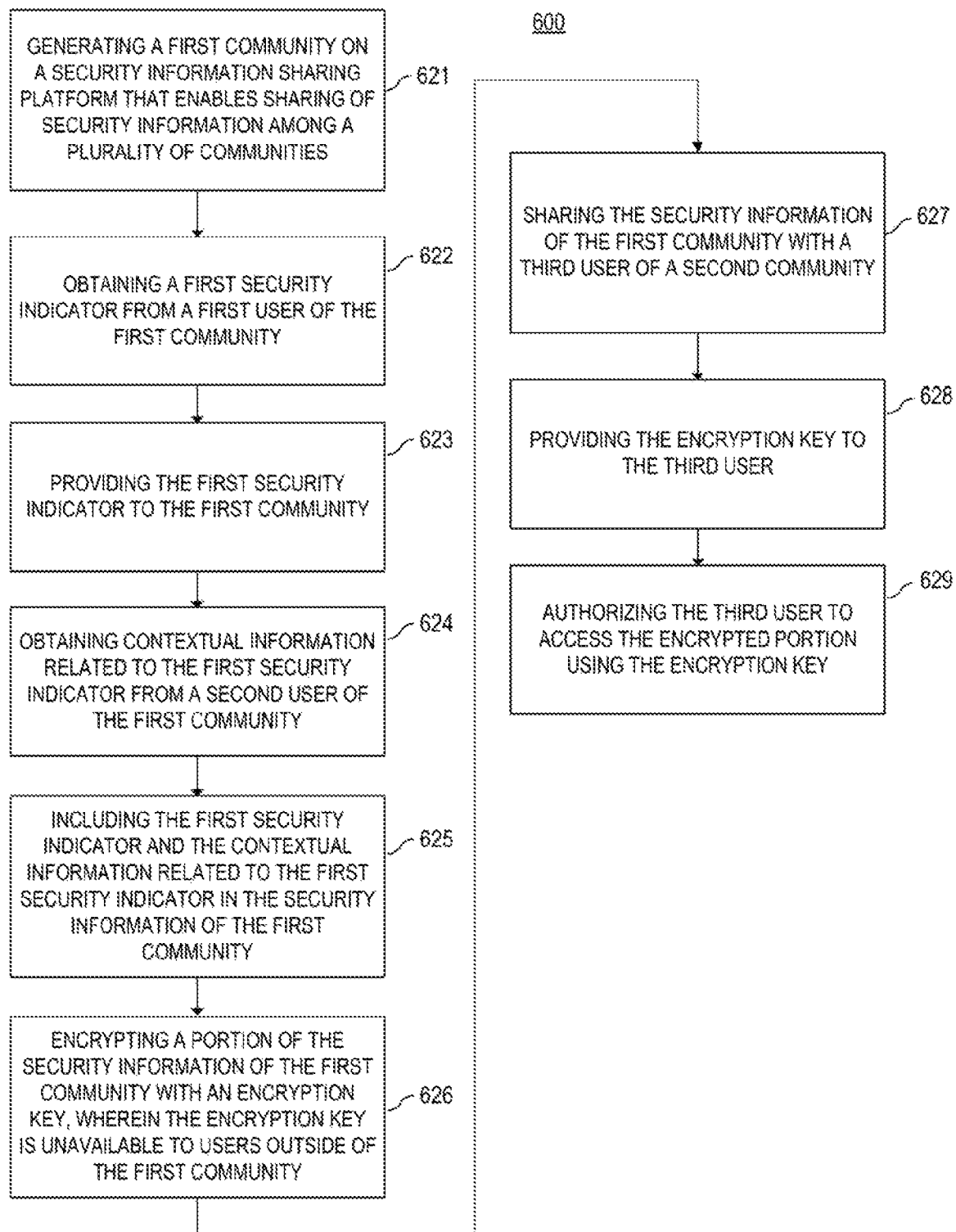
FIG. 6 is a flow diagram depicting an example method for sharing community-based security information.

FIG. 6 is a flow diagram depicting an example method 600 for sharing community-based security information. Method 600 as illustrated (and described in greater detail below) is meant to be an example and, as such, should not be viewed as limiting. Method 600 may be implemented in the form of executable instructions stored on a machine-readable storage medium, such as storage medium 210, and/or in the form of electronic circuitry.

In block 621, method 600 may include generating first community on a security information sharing platform that enables sharing of security information among a plurality of communities. Referring back to FIG. 1, community, generate engine 121 may be responsible for implementing block 621.

In block 622, method 600 may include obtaining a first security indicator from, a first user of the first community. Referring back to FIG. 1, security information obtain engine 122 may be responsible for implementing block 622.

In block 623, method 600 may include providing the first security indicator to the first community. Referring back to FIG. 1, security information obtain engine 122 may be responsible for implementing block 623.

In block 624, method 600 may include obtaining contextual information related to the first security indicator from a second user of the first community. Referring back to FIG. 1, security information obtain engine 122 may be responsible for implementing block 624.

In block 625, method 600 may include including the first security indicator and the contextual information related to the first security indicator in the security information of the first community. Referring back to FIG. 1, security information obtain engine 122 may be responsible for implementing block 625.

In block 626, method 600 may include encrypting a portion of the security information of the first community with an encryption key, wherein the encryption key is unavailable to users outside of the first community. Referring back to FIG. 1, security information encrypt engine 123 may be responsible for implementing block 626.

In block 627, method 600 may include sharing the security information of the first community with a third user of a second community. Referring back to FIG. 1, security information encrypt engine 123 may be responsible for implementing block 627.

In block 628, method 600 may include providing the encryption key to the third user. Referring back to FIG. 1, security information encrypt engine 123 may be responsible for implementing block 628.

In block 629, method 600 may include authorizing the third user to access the encrypted portion using the encryption key. Referring back to FIG. 1, security information encrypt engine 123 may be responsible for implementing block 629.

The foregoing disclosure describes a number of example implementations for sharing of community-based security information. The disclosed examples may include systems, devices, computer-readable storage media, and methods for sharing community-based security information. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be, used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such, modifications and variations are intended to be included within the scope of this disclosure and protected by the following claims.

The invention claimed is:

1. A method for sharing of community-based security information, the method comprising:
generating a first community on a security information sharing platform that enables sharing of security information among a plurality of communities;
obtaining a first security indicator from a first user of the first community;
providing the first security indicator to the first community;
obtaining contextual information related to the first security indicator from a second user of the first community;
including the first security indicator and the contextual information related to the first security indicator in community-based security information of the first community; and
encrypting a portion of the community-based security information of the first community with an encryption key, wherein the encryption key is unavailable to users outside of the first community.

2. The method of claim 1, further comprising:
sharing the community-based security information of the first community with a third user of a second community, wherein the third user has access to the community-based security information of the first community other than the encrypted portion.

3. The method of claim 2, further comprising:
providing the encryption key to the third user; and
authorizing the third user to access the encrypted portion using the provided encryption key.

4. The method of claim 1, further comprising:
obtaining a second security indicator from the second user of the first community;
providing the second security indicator to the first community;
obtaining contextual information related to the second security indicator from a third user of the first community; and
including the second security indicator and the contextual information related to the second security indicator in the community-based security information of the first community.

5. The method of claim 1, wherein the first security indicator comprises at least one observable selected from among an Internet Protocol (IP) address, a domain name, an e-mail address, a Uniform Resource Locator (URL), or a software file hash.

6. The method of claim 1, wherein the contextual information related to the first security indicator comprises one or more of an investigation result that is provided by the second user for the first security indicator, an indicator score for the first security indicator, a source entity for the first security indicator, and a threat actor for the first security indicator.

7. The method of claim 1, wherein the first security indicator specifies an observable relating to a security threat.

8. The method of claim 1, wherein the generating of the first community on the security information sharing platform comprises receiving a list of users at the security information sharing platform.

9. The method of claim 1, wherein the generating of the first community on the security information sharing platform comprises identifying users and inviting, by the security information sharing platform, the identified users to join the first community.

10. The method of claim 1, wherein the obtaining of the first security indicator comprises receiving the first security indicator from a threat intelligence feed transmitted by a source.

11. The method of claim 1, wherein the contextual information includes information about whether a threat identified in the first security indicator was successful in an attack, and wherein the encrypting of the portion of the community-based security information comprises encrypting the contextual information and leaving unencrypted the first security indicator in the community-based security information.

12. A non-transitory machine-readable storage medium comprising instructions that upon execution cause a system to:
generate a community on a security information sharing platform that allows sharing of security information among a plurality of communities;
receive, from a first user who does not belong to the community, a request to access community-based security information of the community;
determine whether the community-based security information of the community is to be shared with the first user, the community-based security information including a portion encrypted with an encryption key that is unique to the community; and
in response to determining that the community-based security information of the community is to be shared with the first user, authorize the first user to access a portion of the community-based security information other than the encrypted portion.

13. The non-transitory machine-readable storage medium of claim 12, wherein the instructions upon execution cause the system to:
receive, from a second user who belongs to the community, a request to access the community-based security information of the community; and
in response to the request from the second user, decrypt the encrypted portion using the encryption key to provide access of the encrypted portion to the second user.

14. The non-transitory machine-readable storage medium of claim 12, wherein the instructions upon execution cause the system to:
provide the encryption key to the first user; and
authorize the first user to access the encrypted portion using the provided encryption key.

15. The non-transitory machine-readable storage medium of claim 12, wherein the community-based security information comprises a security indicator and contextual information related to the security indicator.

16. The non-transitory machine-readable storage medium of claim 12, wherein users of the community have access to: the community-based security information of the community, and community-based security information of other communities shared with the community.

17. A system comprising:
a processor; and
a non-transitory storage medium storing instructions executable on the processor to:
obtain a security indicator for a first community of a security information sharing platform that allows sharing of security information among a plurality of communities;

cause presentation, via a user interface, of the security indicator to a first user of the first community;

obtain contextual information related to the security indicator from the first user;

include the security indicator and the contextual information in community-based security information of the first community;

encrypt a portion of the community-based security information with an encryption key that is unique to the first community; and share the community-based security information with a second user outside of the first community, wherein the second user is prevented from accessing the encrypted portion without the encryption key.

18. The system of claim 17, wherein the second user belongs to a second community of the security information sharing platform or is a system administrator of the security information sharing platform.

19. The system of claim 17, wherein the instructions are executable on the processor to authorize users of the first community to access the encrypted portion.

20. The system of claim 17, wherein the instructions are executable on the processor to:

provide the encryption key to the second user to authorize the second user to access the encrypted portion using the provided encryption key.

* * * * *